(12) United States Patent
Suzuki et al.

(10) Patent No.: US 8,159,180 B2
(45) Date of Patent: Apr. 17, 2012

(54) BATTERY CHARGING DEVICE AND DELAY ANGLE CONTROL METHOD FOR BATTERY CHARGING DEVICE

(75) Inventors: Hidenori Suzuki, Hanno (JP); Tatsuya Arai, Hidaka (JP); Takeshi Yanagisawa, Sakado (JP); Atsuo Ota, Fujimino (JP)

(73) Assignees: Shindengen Electric Manufacturing Co., Ltd., Tokyo (JP); Honda Motor Co., Ltd., Tokyo (JP)

( * ) Notice: Subject to any disclaimer, the term of this patent is extended or adjusted under 35 U.S.C. 154(b) by 390 days.

(21) Appl. No.: 12/294,778

(22) PCT Filed: Mar. 29, 2007

(86) PCT No.: PCT/JP2007/056907
§ 371 (c)(1),
(2), (4) Date: Sep. 26, 2008

(87) PCT Pub. No.: WO2007/114268
PCT Pub. Date: Oct. 11, 2007

(65) Prior Publication Data
US 2010/0237825 A1 Sep. 23, 2010

(30) Foreign Application Priority Data
Mar. 30, 2006 (JP) ................................. 2006-095503

(51) Int. Cl.
*H02J 7/14* (2006.01)
(52) U.S. Cl. ........................... 320/104; 320/148; 363/87
(58) Field of Classification Search ........................ None
See application file for complete search history.

(56) References Cited

U.S. PATENT DOCUMENTS

| | | | |
|---|---|---|---|
| 5,739,677 A * | 4/1998 | Tsutsui et al. | ................. 322/25 |
| 6,049,194 A | 4/2000 | Nakagawa et al. | |
| 2004/0085047 A1 | 5/2004 | Suzuki et al. | |
| 2005/0093520 A1 * | 5/2005 | Muramatsu et al. | ............ 322/29 |
| 2006/0097703 A1 | 5/2006 | Suzuki et al. | |

FOREIGN PATENT DOCUMENTS

| JP | 8-298731 A | 11/1996 |
|---|---|---|
| JP | 11-046456 A | 2/1999 |
| JP | 2004-173482 A | 6/2004 |
| JP | 2004-194427 A | 7/2004 |
| JP | 2006-136122 A | 5/2006 |

* cited by examiner

*Primary Examiner* — Melissa Koval
*Assistant Examiner* — Robert Grant
(74) *Attorney, Agent, or Firm* — Arent Fox LLP

(57) ABSTRACT

A battery charging device of the present invention has a rectifier portion that is formed by switching elements, and performs advance angle/delay angle control. An advance angle/delay angle amount in the advance angle/delay angle control is determined based on a differential voltage between the voltage of a battery and a predetermined target voltage. In this case, when a determined delay angle amount exceeds a delay angle limit value, delay angle control is performed using the delay angle limit value. Moreover, the power generation amount of an alternating current generator is detected, and the delay angle amount and power generation amount are stored. If the current delay angle amount is greater than the previous delay angle amount, and the previous power generation amount is greater than the current power generation amount, then the previous delay angle amount is set as the delay angle limit value.

6 Claims, 7 Drawing Sheets

ADVANCE ANGLE/DELAY ANGLE CONTROL

BATTERY CHARGING DEVICE AND DELAY ANGLE CONTROL METHOD FOR BATTERY CHARGING DEVICE

TECHNICAL FIELD

The present invention relates to a battery charging device that uses an alternating current generator and is employed in a two-wheeled vehicle, and to an advance angle/delay angle control method for a battery charging device. In particular, the present invention relates to a battery charging device and a delay angle control method that make it possible to automatically set an optimum delay angle limit value irrespective of alternating current generator, the battery type, and the size of the displacement.

Priority is claimed on Japanese Patent Application No. 2006-95503, filed Mar. 30, 2006, the content of which is incorporated herein by reference.

BACKGROUND ART

FIG. 8 is a view illustrating a battery charging device used in a two-wheeled vehicle and the like.

A permanent magnet type of three-phase alternating current generator (referred to below simply as an 'alternating current generator') 1 is driven to rotate from an engine side (not shown). Three-phase alternating current that is output from the alternating current generator 1 is rectified (undergoes alternating current/direct current conversion) by a battery charging device 3A so as to become direct current output, and charging current is supplied to a battery 2 by the direct current output.

In this case, in order for the battery charging to be performed efficiently, advance angle/delay angle control is conducted which controls the power generation amount of the alternating current generator 1. This advance angle/delay angle control is achieved by forming a rectifier circuit inside the battery charging device 3A from switching elements that have a bridge configuration, and then advancing or delaying the electricity supply timings of these switching elements relative to the phase of the alternating current output voltage of the alternating current generator 1.

In this advance angle/delay angle control, the power generation amount of the alternating current generator 1 is controlled using an advance angle/delay angle amount as a control parameter. When the voltage of the battery 2 is lower than a reference voltage and requires battery charging, delay angle control is performed on the battery charging device 3A and the battery is charged. When the voltage of the battery 2 is higher than the reference voltage and does not require battery charging, advance angle control is performed on the battery charging device 3A and energy is discharged from the battery to the alternating current generator.

In this case, as is shown in FIG. 9, in a delay angle control state, it is possible to gradually increase the power generation amount (the battery charging amount) by increasing the delay angle amount from 0. However, although it is possible to raise the power generation amount up to a particular fixed delay angle amount, if this fixed delay angle amount is exceeded, then, conversely, there ends up being a reduction in the power generation amount. Accordingly, it is necessary to set the value of the limit of the delay angle amount (referred to below on occasion as the 'delay angle limit value') where the amount of power generated by the alternating current generator 1 is at the maximum, to a suitable value.

When setting this delay angle limit value, conventionally, combined tests (experiments) are performed in accordance with the alternating current generator that are actually being used, the type of battery, and the size of the engine (the displacement), and the optimum delay angle limit value is then determined.

In this manner, a large number of tests are carried out in order to determine the optimum delay angle limit value, requiring considerable labor including making tables showing corresponding relationships between the delay angle limit values, the alternating current generators, the batteries, and the displacements determined from the results.

This conventional type of output control device for a synchronous motor is described in Patent document 1. The conventional technology has the objects of eliminating unnecessary power generation by controlling fluctuations in the power generation amount, and performing battery charging properly while maintaining a superior acceleration performance. Because of this, the control voltage value that is used to control the generated voltage is set as a function of the engine speed for both accelerating and for normal running. Namely, the control voltage value is decided in accordance with a determination of acceleration which is made based on the engine speed and the throttle opening angle, and an advance angle/delay angle amount setting section decides the energization timing to each phase of the stator coil such that the battery voltage is converged to the control voltage value.

However, the above described conventional technology aims to perform battery charging properly while maintaining a superior acceleration performance and is not intended to solve the problem of excessive labor being required in order to set the optimum delay angle limit value in accordance with the combination of the alternating current generator, the type of battery, and the displacement.

[Patent document 1] Japanese Unexamined Patent Application, First Publication No. 2004-194427

DISCLOSURE OF INVENTION

Problems to be Solved by the Invention

As has been described above, in a conventional battery charging device, in the setting of the delay angle limit value in the advance angle/delay angle control, an optimum limit value is decided using a specific combination of tests with the alternating current generator that is actually used, the battery, and the load. Because of this, considerable labor has been necessary in order to set the optimum delay angle limit value in accordance with alternating current generators, the type of battery, and the size of the displacement.

The present invention was conceived in order to solve the above described problems and an object thereof is to provide a battery charging device and a delay angle control method that make it possible to automatically set an optimum delay angle limit value irrespective of alternating current generator, the type of battery, and the size of the displacement.

Means for Solving the Problem

The present invention is achieved in order to solve the above described problems and a battery charging device of the present invention is connected between an alternating current generator and a battery, and converts alternating current power output from the alternating current generator into direct current power and supplies the direct current power to the battery, and the battery charging device includes: a rectifier circuit that has a bridge configuration formed by switching elements, and that performs advance angle/delay angle control by either advancing or delaying energization timing to the switching elements relative to a phase of an alternating current output voltage of the alternating current generator; a power generation amount calculation circuit that detects an output voltage and an output current of the alternating current generator, and calculates a power generation amount of the alternating current generator; an advance angle/delay angle calculation circuit that generates a differential voltage between a voltage of the battery and a predetermined target voltage, and determines an advance angle/delay angle amount of the energization timing to the switching elements based on the differential voltage; an advance angle/delay angle control circuit that performs advance angle/delay angle control of the switching elements using the advance angle/delay angle amount determined by the advance angle/delay angle calculation circuit, and that, when a delay angle amount exceeds a delay angle limit value in case where delay angle control is performed, performs delay angle control of the switching elements using the delay angle limit value; and a delay angle limit value setting circuit that stores the delay angle amount and the power generation amount, and compares a previous delay angle amount and a previous power generation amount with a current delay angle amount and a current power generation amount, and when the current delay angle amount is larger than the previous delay angle amount and the previous power generation amount is larger than the current power generation amount, sets the previous delay angle amount as the delay angle limit value.

By employing this structure, a rectifier portion of a battery charging device has a bridge configuration formed using switching elements, and advance angle/delay angle control is performed using these switching elements. At this time, a differential voltage between the battery voltage and a predetermined target voltage is generated, advance angle/delay angle amount for the switching elements is determined based on this differential voltage, and an energization timing to the switching elements is controlled by using the advance angle/delay angle amount. When the advance angle/delay angle amount is a delay angle amount and exceeds a delay angle amount limit value (a delay angle amount where the power generation amount is substantially at the maximum), then the delay angle amount is limited to the delay angle limit value. Moreover, the power generation amount of the generator is detected, and the delay angle amount and power generation amount are stored. A comparison is then made between the previous delay angle amount and the previous power generation amount and the current delay angle amount and the current power generation amount, and if the current delay angle amount is greater than the previous delay angle amount, and also the previous power generation amount is greater than the current power generation amount, then the previous delay angle amount is set as the delay angle limit value.

As a result, when advance angle/delay angle control is performed in battery charging devices, it is possible to automatically set an optimum delay angle limit value irrespective of alternating current generators, the type of battery, and the size of the displacement.

In the battery charging device of the present invention, the advance angle/delay angle control circuit may perform delay angle control of the switching elements using the determined delay angle amount when the advance angle/delay angle amount determined by the advance angle/delay angle calculation circuit is a delay angle amount, and either the delay angle limit value is not set or the delay angle amount is less than the delay angle limit value, and the delay angle limit value setting circuit may store the delay angle amount and the power generation amount, and compare the previous delay angle amount and the previous power generation amount with the current delay angle amount and the current power generation amount, so that the delay angle limit value setting circuit may set the previous delay angle amount as the delay angle limit value when the current delay angle amount is larger than the previous delay angle amount and the previous power generation amount is larger than the current power generation amount, and the delay angle limit value setting circuit may cancel a setting of the delay angle limit value when the current delay angle amount is smaller than the previous delay angle amount.

By employing the above described structure, when the delay angle amount determined by the advance angle/delay angle calculation circuit is moving in a decreasing direction in case where delay angle limit value is note set, it is possible to cancel the setting of the delay angle limit value.

As a result, it is possible to avoid making the delay angle limit value a fixed value, and to appropriately set an optimum delay angle limit value that corresponds to changes in the surrounding environment.

In the battery charging device of the present invention, the alternating current generator may include a sub-coil that detects the output voltage, and a current sensor that detects the output current, the battery charging device may further include a voltage detection circuit that generates a rectangular wave from a voltage waveform detected by the sub-coil of the alternating current generator that is in synchronization with the voltage waveform, a synchronous triangular wave generating circuit that generates a triangular wave that is in synchronization with a signal of the rectangular wave that is output from the voltage detection circuit, and an error amplifier that compares the voltage of the battery with the predetermined target voltage and outputs an error signal, the power generation amount calculation circuit may calculate the power generation amount of the alternating current generator based on the output voltage of the alternating current generator detected by the sub-coil, and on a value of the output current of the alternating current generator detected by the current sensor, the advance angle/delay angle calculation circuit may include a comparator circuit that determines the advance angle/delay angle amount by comparing the triangular waves output from the synchronous triangular wave generating circuit with an output of the error amplifier, the advance angle/delay angle control circuit may receive the advance angle/delay angle amounts from the comparator circuit; and the delay angle limit value setting circuit may store the delay angle amount determined by the comparator circuit, and the power generation amount determined by the power generation amount calculation circuit.

By employing the above structure, a generator includes a sub-coil and a current sensor, and a power generation amount of an alternating current generator is calculated. A rectangular wave is generated by a voltage detection circuit in synchronization with a voltage waveform detected by a sub-coil, and a triangular wave is generated in synchronization with the rectangular wave by a synchronous triangular wave generation circuit. An error amplifier compares the voltage of a battery with a target voltage, and generates an error signal. An advance angle/delay angle amount is then determined by a comparator circuit comparing the triangular wave output from the synchronous triangular wave generation circuit with the output of the error amplifier. When the advance angle/delay angle amount determined by this comparator circuit is a delay angle amount and also exceeds a predetermined delay angle limit value, then the delay angle amount is limited to the delay angle limit value by the advance angle/delay angle control circuit. Moreover, the delay angle limit value setting circuit stores the delay angle amount and power generation amount, and compares the previous delay angle amount and the previous power generation amount with the current delay angle amount and the current power generation amount, and if the current delay angle amount is greater than the previous delay angle amount, and also the previous power generation amount is greater than the current power generation amount, then the previous delay angle amount is set as the delay angle limit value.

As a result, when advance angle/delay angle control is performed in a battery charging device, it is possible to automatically set an optimum delay angle limit value irrespective of alternating current generator, the type of battery, and the size of the displacement.

In the battery charging device of the present invention, the rectangular wave in the voltage detection circuit and the triangular wave in the synchronous triangular wave generating circuit may be generated for each of a U phase, a V phase, and a W phase, and in the comparator circuit, when the advance angle/delay angle amount is determined by comparing the triangular wave output from the synchronous triangular wave generating circuit with the output of the error amplifier, an advance angle/delay angle amount of the U phase may be determined by comparing a triangular wave of the W phase output from the synchronous triangular wave generating circuit with the output of the error amplifier, an advance angle/delay angle amount of the V phase may be determined by comparing a triangular wave of the U phase output from the synchronous triangular wave generating circuit with the output of the error amplifier, and an advance angle/delay angle amount of the W phase may be determined by comparing a triangular wave of the V phase output from the synchronous triangular wave generating circuit with the output from the error amplifier.

By employing this structure, it is possible to determine, for example, an advance angle/delay angle amount of the U phase by comparing a triangular wave of the W phase that is output by the synchronous triangular wave generation circuit with the output of the error amplifier.

As a result, when advance angle/delay angle control is being performed in a battery charging device, it is possible to set the control range for the advance angle/delay angle control to 0° to 120° for the advance angle side and to 0° to 60° for the delay angle side.

In the battery charging device of the present invention, the switching elements may be N-channel MOSFET, and the battery charging device may includes a three-phase bridge rectifier circuit of the switching elements.

As a result, it is possible to automatically set a delay angle limit value in the advance angle/delay angle control in case where a battery is charged using a three-phase alternating current generator.

A delay angle control method of the present invention is a delay angle control method for a battery charging device that is connected between an alternating current generator and a battery, and converts alternating current power output from the alternating current generator into direct current power and supplies the direct current power to the battery, the delay angle control method includes: a rectifier step of using switching elements having a bridge configuration, and performing advance angle/delay angle control by either advancing or delaying energization timing to the switching elements relative to a phase of an alternating current output voltage of the alternating current generator; a power generation amount calculation step of detecting an output voltage and an output current of the alternating current generator, and calculating a power generation amount of the alternating current generator; an advance angle/delay angle calculation step of generating a differential voltage between a voltage of the battery and a predetermined target voltage, and determining an advance angle/delay angle amount of the energization timing to the switching elements based on the differential voltage; an advance angle/delay angle control step of performing advance angle/delay angle control of the switching elements using the advance angle/delay angle amount determined in the advance angle/delay angle calculation step, and when a delay angle amount exceeds a delay angle limit value in case where delay angle control is performed, performing delay angle control of the switching elements using the delay angle limit value; and a delay angle limit value setting step of storing the delay angle amount and the power generation amount, and comparing a previous delay angle amount and a previous power generation amount with a current delay angle amount and a current power generation amount, and when the current delay angle amount is larger than the previous delay angle amount and the previous power generation amount is larger than the current power generation amount, setting the previous delay angle amount as the delay angle limit value.

By performing the above described steps, a rectifier portion of a battery charging device has a bridge configuration which is formed using switching elements, and advance angle/delay angle control is performed using these switching elements. At this time, a differential voltage between the battery voltage and a predetermined target voltage is generated, an advance angle/delay angle amount for the switching elements is determined based on this differential voltage, and an energization timing to the switching elements are controlled by using these advance angle/delay angle amounts. When an advance angle/delay angle amount is a delay angle amount and also exceeds a delay angle limit value (a delay angle amount where the power generation amount is substantially at the maximum), then the delay angle amount is limited to the delay angle limit value. Moreover, the power generation amount of the generator is detected, and the delay angle amount and power generation amount are stored. A comparison is then made between the previous delay angle amount and the previous power generation amount with the current delay angle amount and the current power generation amount, and if the current delay angle amount is greater than the previous delay angle amount, and also the previous power generation amount is greater than the current power generation amount, then the previous delay angle amount is set as the delay angle limit value.

As a result, when advance angle/delay angle control is performed in a battery charging device, it is possible to automatically set an optimum delay angle limit value irrespective of alternating current generator, the type of battery, and the size of the displacement.

Effect of the Invention

In the present invention, an advance angle/delay angle amount is determined based on a differential voltage between the voltage of a battery and a target voltage, and a delay angle amount is restricted to a delay angle limit value. In addition, a delay angle amount and a power generation amount are stored, and when there is a reduction in the power generation amount irrespective of there is an increase in the delay angle amount, then the previous delay angle amount is set as the delay angle limit value. As a result, it is possible to automatically set an optimum delay angle limit value irrespective of alternating current generator, the type of battery, and the size of the displacement.

REFERENCE SYMBOLS

Figure 1:
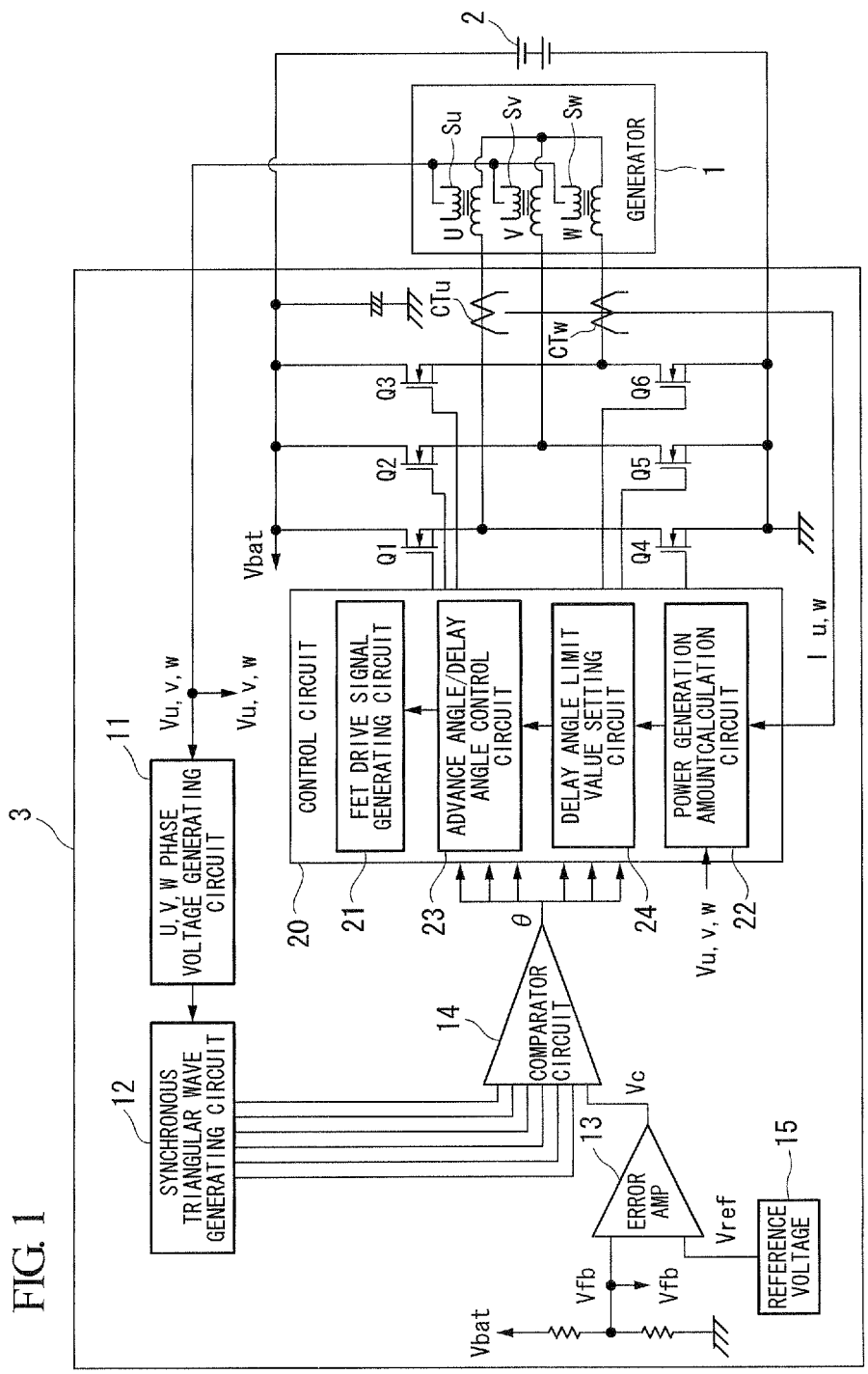
FIG. 1 is a block diagram showing a battery charging device according to an embodiment of the present invention.

1 Permanent magnet type of three-phase alternating current generator (alternating current generator)
2 Battery
3, 3A Battery charging devices
11 U, V, W phase voltage detection circuit
12 Synchronous triangular wave generating circuit
13 Error amplifier
14 Comparator circuit
20 Control circuit
21 FET drive signal generating circuit
22 Power generation amount calculation circuit
23 Advance angle/delay angle control circuit
24 Delay angle limit value setting circuit
CTu, Ctw Current sensors
Q1 to Q6 Switching elements
Su, Sv, Sw Sub-coils
Vbat Battery voltage
Vc Error amplifier output
Vfb Feedback signal
θ Advance angle/delay angle amount

BEST MODE FOR CARRYING OUT THE INVENTION

A best mode for carrying out the present invention will be described next with reference to the drawings.
(Description of an Example of the Basic Structure of the Battery Charging Device of the Present Invention)

FIG. 1 is a block diagram showing an example of the basic structure of the battery charging device of the present invention, and is an example of a battery charging device 3 that performs full-wave rectification on alternating current output from a three-phase alternating current magnet type of alternating current generator (referred to below simply as an 'alternating current generator') 1, and charges a battery 2 using this output.

In this battery charging device 3, a full-wave rectification circuit that rectifies three-phase alternating current output from the alternating current generator 1 has a bridge configuration of N-channel type power MOSFET switching elements Q1 to Q6, and the battery charge state (or discharge state) is controlled by performing delay angle control or advance angle control on the timing of the switching operations of each switching element (the energization timing) to either delay or advance the phase relative to the alternating current output voltage of the alternating current generator 1.

An outline of the structure of the battery charging device 3 of the present invention will now be described with reference to FIG. 1.

Sub-coils Su, Sv, and Sw in the alternating current generator 1 are sub-coils that detect alternating current output voltage of each of three-phases (U, V, and W phases). A U phase, V phase, and W phase voltage detection circuit 11 generates rectangular waves from voltage waveforms (alternating current waveforms) Vu, v, and w detected by the sub-coils Su, Sv, and Sw and outputs them to a synchronous triangular wave generating circuit 12.

The synchronous triangular wave generating circuit 12 generates triangular waves from the rectangular waves that are output from the U phase, V phase, W phase voltage detection circuit 11 such that these triangular waves are in synchronization with these signals. Heights of these triangular waves (the maximum values of the triangular waves) are equal, irrespective of the size of the pulse width of the rectangular waves.

An error amplifier 13 compares a feedback signal Vfb from an actual battery voltage Vbat with a set value (a target value) Vref of the battery charging voltage, and then amplifies the signal of the difference between these and outputs it as an error amplifier output Vc. Note that when a battery voltage Vbat is low and Vfb is less than Vref (Vfb<Vref), the error amplifier output Vc is more than 0 (Vc>0), while when the battery voltage Vbat is high and Vfb is more than Vref (Vfb>Vref), the error amplifier output Vc is less than 0 (Vc<0). When Vc is more than 0 (Vc>0), charging to the battery 2 (delay angle control) is performed, while when Vc is less than 0 (Vc<0), discharging from the battery 2 (advance angle control) is performed.

A comparator circuit (an advance angle/delay angle calculation circuit) 14 compares the triangular waves output from the synchronous triangular wave generating circuit 12 with the output Vc from the error amplifier 13, and then decides the switching timings (advance angle/delay angle amounts θ) of the switching elements Q1 through Q6, and outputs signals of the advance angle/delay angle amounts θ to a control circuit 20.

An FET drive signal generating circuit 21 in the control circuit 20 receives signals of the switching timings (the advance angle/delay angles amounts θ) for the switching elements via the advance angle/delay angle control circuit 23. The FET drive signal generating circuit 21 generates drive signals (gate drive signals) used to turn the switching elements Q1 through Q6 on or off, based on the advance angle/delay angle amounts θ.

A power generation amount calculation circuit 22 is supplied with signals Vu, v, and w of the alternating current output voltage of the alternating current generator 1 from the sub-coils Su, Sv, and Sw, and is supplied with signals Iu and w of the currents of the U phase and W phase of the alternating current generator 1 from the current sensors CTu and CTw, and calculates the power generation amount of the alternating current generator 1.

An advance angle/delay angle control circuit 23 sends signals of the advance angle/delay angle amounts θ input from the comparator circuit 14 to the FET drive signal generating circuit 21. At this time, the delay angle amount is restricted so that it does not rise above a delay angle limit value.

In addition, a delay angle limit value setting circuit 24 performs processing to set a limit value for the delay angle based on the advance angle/delay angle amounts θ input from the comparator circuit 14, and on the power generation amounts determined by the power generation amount calculation circuit 22. The contents of this processing are described in detail below.

Note that a microcomputer (or microcontroller) is included in the battery charging device 3, and some of the processing functions of the control circuit 20, the comparator circuit 14, and the other circuits inside the battery charging device 3, which can be executed by software programs, may be carried out by software processes. It is to be understood that these processing functions may be constructed by hardware.

(Description of a Method of Generating Triangular Wave Voltage in a Synchronous Triangular Wave Generating Circuit)

Next, a description will be given of a mechanism for generating triangular wave voltage in the synchronous triangular wave generating circuit 12 with reference to FIGS. 2 and 3.

Generally, because the frequency of the alternating current voltage output by an alternating current generator does not change abruptly, it can be considered that the waveform of the previous cycle and the waveform of the current cycle are substantially the same. For example, in FIG. 2, if the waveform 2 is taken to be the waveform of the current cycle, then it can be seen that a half cycle T2 of the waveform 2 and a half cycle T1 of a waveform 1 of the previous cycle are substantially the same.

Using this characteristic, a triangular wave voltage VB is generated by the following process.

Figure 2:
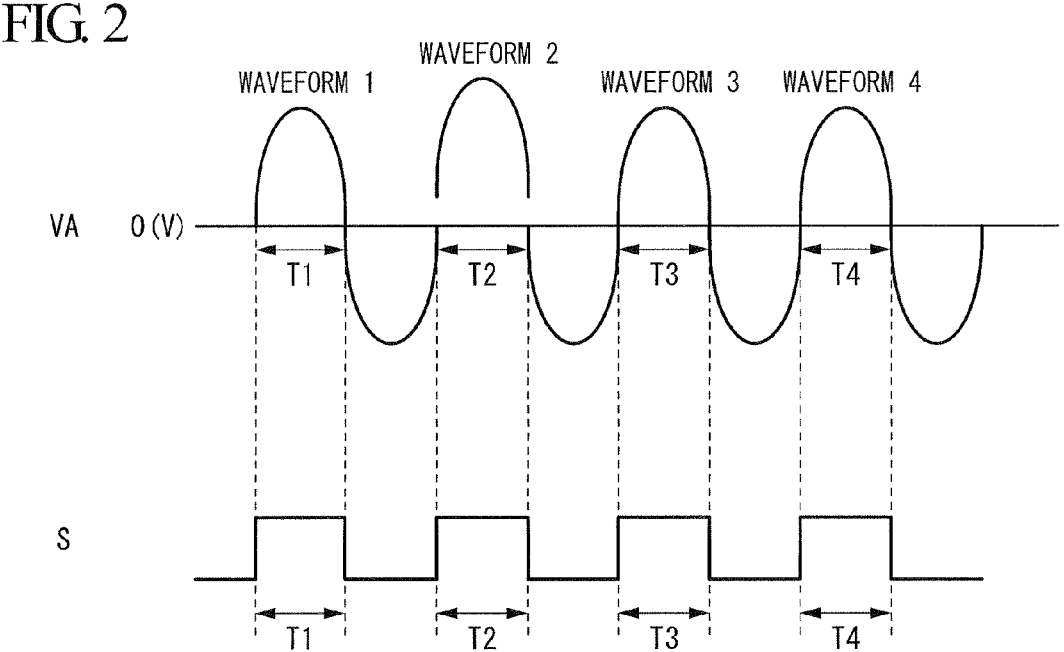
FIG. 2 is a graph used to illustrate a mechanism for generating a rectangular wave in a U phase, V phase, W phase voltage generating circuit of the generator shown in FIG. 1.

(Step 1) As is shown in FIG. 2, in the cycle of the waveform 1, a rectangular wave S is generated from an alternating current voltage VA output by an alternating current generator. A half cycle of the rectangular wave S that corresponds to this waveform 1 matches the half cycle T1 of the alternating current voltage VA of the cycle of the waveform 1.

(Step 2) Next, the time of the half cycle T1 of the rectangular wave S is counted.

(Step 3) Next, the count number of the time of the half cycle T1 is divided by a predetermined resolution n so as to obtain a time t1 (=T1/n). Here, the resolution n is an amount that prescribes the smoothness of the slope of the triangular wave voltage VB, and the higher the resolution n, the smoother the slope of the triangular wave voltage VB.

(Step 4) Next, the peak voltage Vp of the triangular wave voltage VB is divided by the predetermined resolution n, so as to obtain a voltage v1 (=Vp/n).

Figure 3:
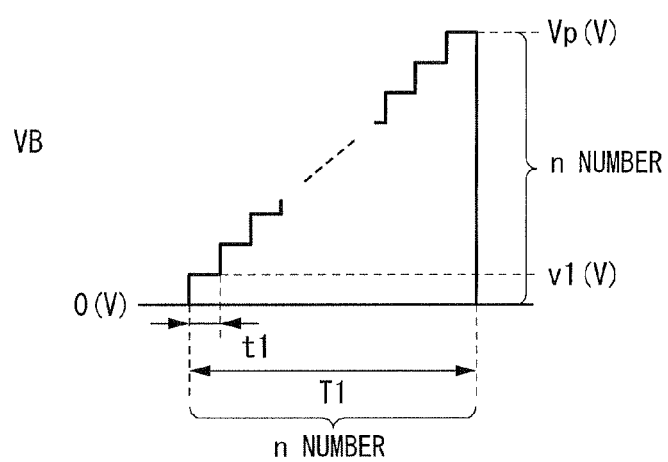
FIG. 3 is a graph used to illustrate a mechanism for generating a triangular wave in the synchronous triangular wave generating circuit shown in FIG. 1.

(Step 5) Next, as is shown in FIG. 3, at the timing of the rise of the waveform 2 of the next cycle (the timing when the counting of T2 is started), the triangular wave voltage VB is raised by the amount of the voltage v1, and this triangular wave voltage VB is maintained for the period of the aforementioned time t1.

(Step 6) In the cycle of the same waveform 2, at the timing when the time t1 has elapsed, the triangular wave voltage VB is further raised by the voltage v1, and this is repeated in total for n number of times. As a result, a stepped waveform such as that shown in FIG. 3 is obtained, and a stepped waveform is obtained that corresponds to the slope portion of the triangular wave voltage that corresponds to the cycle of the waveform 2. If the value of the resolution n is increased, the stepped waveform becomes smooth, and a superior triangular wave can be obtained.

By performing the above processing, using the waveform of the alternating current voltage VA of the previous cycle, a voltage waveform is generated which is the triangular wave voltage corresponds to each cycle of the alternating current voltage VA, and in which the peak voltage Vp is uniform.

The synchronous triangular wave generation circuit 12 that uses the above described triangular wave voltage generation mechanism, generates triangular wave voltage which is used to control the ON/OFF timings (the advance angle/delay angle amounts θ) of the switching elements Q1 through Q6 in this battery charging device. This synchronous triangular wave generation circuit 12 can be constructed, for example, from a counter, a division circuit, and a waveform generating circuit. The counter counts the time of a half cycle of the alternating current voltage waveform of the first cycle output by an alternating current generator (for example, the time T1 in the cycle of the waveform 1 in FIG. 2). The division circuit divides the count number obtained by the counter by the predetermined resolution n (a predetermined value). The waveform generating circuit generates in a second cycle that comes after the first cycle (for example, the cycle of the waveform 2 in FIG. 2) a stepped voltage waveform that rises by the predetermined voltage v1 each time there is a lapse in the time t1 shown by the result of the division by the division circuit in the aforementioned first cycle. This stepped voltage waveform is output as the waveform of the aforementioned triangular wave voltage.

(Description of the Energization Timing to the Switching Elements in the Advance Angle/Delay Angle Control).

Next, a description will be given of the energization timings (the advance angle/delay amounts θ) for the switching elements Q1 through Q6 that are generated by the comparator circuit 14 based on the triangular waves output from the synchronous triangular wave generating circuit 12 and on the error amplifier output Vc which is output from the error amplifier 13.

Figure 4A:
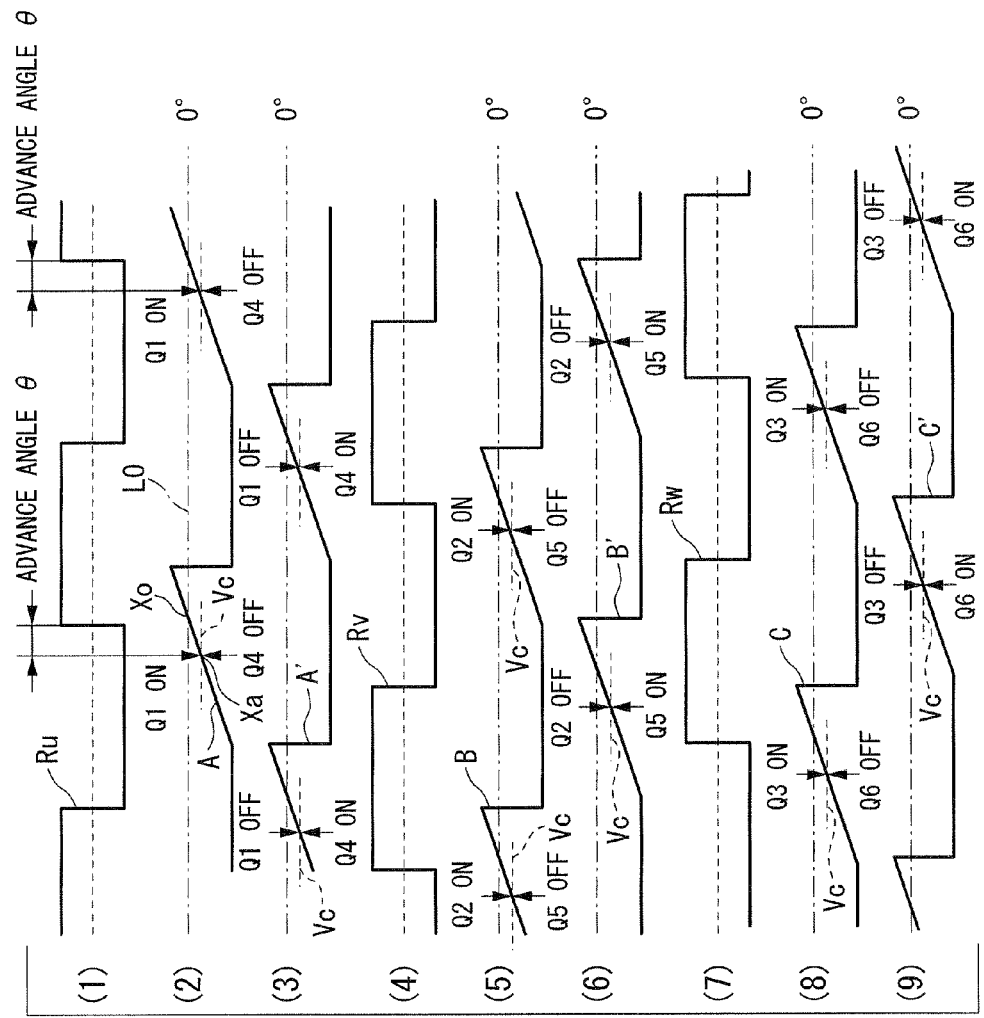
FIG. 4A is a waveform diagram showing an advance angle control energization timing in the embodiment of the present invention.
Figure 5A:
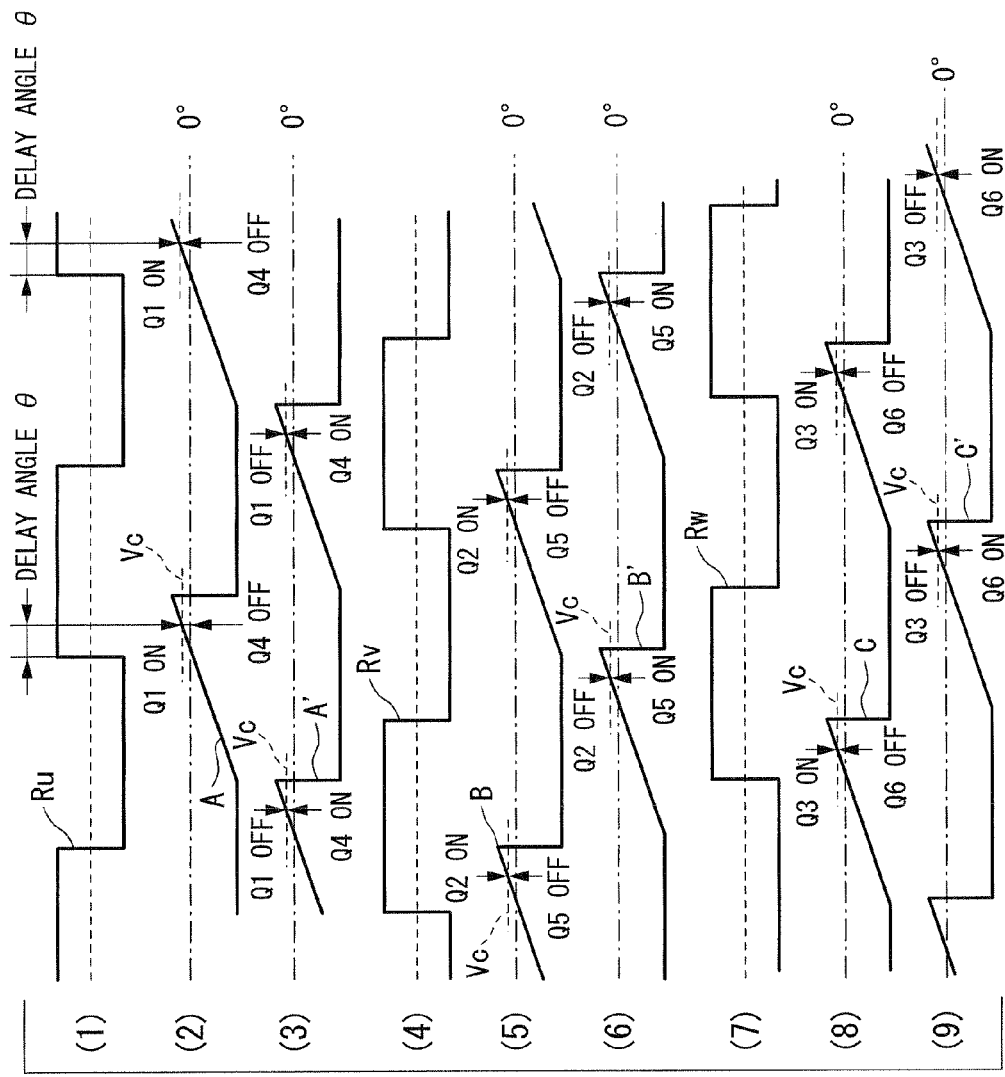
FIG. 5A is a waveform diagram showing a delay angle control energization timing in the embodiment of the present invention.

FIG. 4A and FIG. 5A are views illustrating energization timings in the advance angle/delay angle control of switching elements. FIG. 4A shows an advance angle control state (a battery discharging state) when the battery voltage Vbat is high, and Vfb is more than Vref and Vc is less than 0 (Vfb>Vref, Vc<0). FIG. 5A shows a delay angle control state (a battery charging state) when the battery voltage Vbat is low, and Vfb is less than Vref and Vc is more than 0 (Vfb<Vref, Vc>0).

In FIG. 4A which shows advance angle control timings (0° to 120° (180° energization)), the waveform (1) in FIG. 4A shows the rectangular wave Ru that is in synchronization with the detected voltage of the U phase sub-coil Su, and is a signal that is output from the U, V, W phase voltage detection circuit 11.

The waveform (2) in FIG. 4A shows a triangular wave A that is generated from the W phase rectangular wave, and is a signal that is output from the synchronous triangular wave generating circuit 12. The waveform (3) in FIG. 4A shows a triangular wave A' that is obtained by phase shifting the triangular wave A by 180°, and is a signal that is output from the synchronous triangular wave generating circuit 12.

The waveform (4) in FIG. 4A shows a rectangular wave Rv that is in synchronization with the detected voltage of the V phase sub-coil Su, and is a signal that is output from the U, V, W phase voltage detection circuit 11.

The waveform (5) in FIG. 4A shows a triangular wave B that is generated from the U phase rectangular wave, and is a signal that is output from the synchronous triangular wave generating circuit 12. The waveform (6) in FIG. 4A shows a triangular wave B' that is obtained by phase shifting the triangular wave B by 180°, and is a signal that is output from the synchronous triangular wave generating circuit 12.

The waveform (7) in FIG. 4A shows a rectangular wave Rw that is in synchronization with the detected voltage of the W phase sub-coil Su, and is a signal that is output from the U, V, W phase voltage generating circuit 11.

The waveform (8) in FIG. 4A shows a triangular wave C that is generated from the V phase rectangular wave, and is a signal that is output from the synchronous triangular wave generating circuit 12. The waveform (9) in FIG. 4A shows a triangular wave C' that is obtained by phase shifting the triangular wave C by 180°, and is a signal that is output from the synchronous triangular wave generating circuit 12.

The above described triangular waves A, A', B, B', C, C' are input into the comparator circuit 14, and are compared in the comparator circuit 14 respectively with the error amplifier output Vc.

Figure 4B:
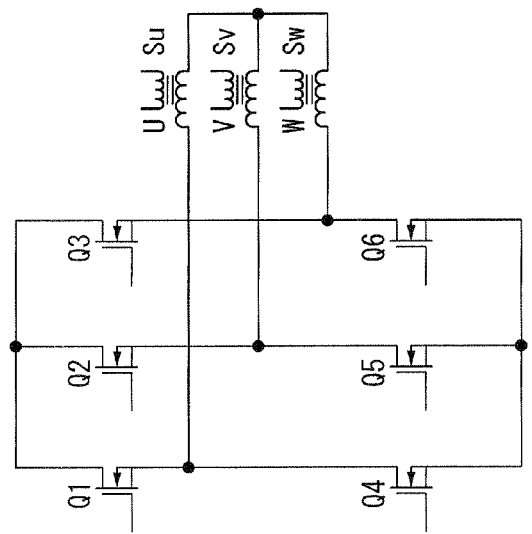
FIG. 4B is a circuit diagram showing a generator and switching elements that are controlled by the advance angle control energization timing shown in FIG. 4A.

In the waveform (2) in FIG. 4A, the triangular wave A that is generated from the W phase rectangular wave Rw is used in order to decide the energization timings (the advance angle/delay amounts θ) of the U phase switching elements Q1 and Q4 which are shown in FIG. 4B. The reason for this is that, taking an intersection point X0 between the triangular wave A and a line shown by the single dot-chain line (a line where the advance angle is)0° as a reference, advance angle/delay angle control is performed within ranges of an advance angle of 0° to 120° and a delay angle of 0° to 60°. For example, if the triangular wave C that is generated from the U phase rectangular wave Ru is used as the triangular wave, then the control range is offset towards the advance angle side, while if the triangular wave C' is used, the control range is offset towards the delay angle side, and thus, advance angle/delay angle control cannot be performed within appropriate ranges of such as an advance angle of 0° to 120° and a delay angle of 0° to 60°.

In this manner, the triangular wave A that is generated from the W phase rectangular wave Rw is compared with the error amplifier output Vc. Namely, the ON timings of the switching element Q1 on the upper side of the U phase and the OFF timings of the switching element Q4 on the lower side of the U phase are decided by the intersection points Xa between the triangular wave A and the error amplifier output Vc. Moreover, the advance angle/delay amounts θ of the U phase are also decided by this.

In this example, the battery charging voltage is higher than the reference voltage and the error amplifier output Vc is less than 0 (Vc<0), and Vc is lower than the line L0 (the line at the level where Vc=0) where the advance angle/delay angle amount is 0°, which is shown by the single dot chain line, and the intersection point Xa between the triangular wave A and Vc comes before the intersection point X0 between the triangular wave and the line L0, and thus advance angle control is performed.

In the same way, the OFF timings of the switching element Q1 and the ON timings of the switching element Q4 of the U phase are decided by the intersection points between the triangular wave A' and the error amplifier output Vc.

Note that in the waveforms (2) and (3) in FIG. 4A, the ON timings of the switching elements Q1 and Q4 are set so as to be slightly delayed relative to the OFF timings of Q1 and Q4. This is because, in order to avoid the upper and lower switching elements Q1 and Q4 being switched ON at the same time, the ON timings are delayed slightly from the OFF timings so that a dead time (a delay time that is determined in accordance with the ON/OFF time characteristics of the FET elements) is set.

As has been described above, in the U phase it is possible to decide the ON/OFF timings (the advance angle/delay angle amounts θ) of the switching elements Q1 and Q4 by comparing the triangular waves A and A' which are generated based on the rectangular wave Rw that is in synchronization with the detected voltage of the W phase sub-coil Sw with the error amplifier output Vc. In addition, the control range of the advance angle is 0° to 120°, and the range of the delay angle is 0° to 60°.

In the same way, in the V phase it is possible to decide the ON/OFF timings (the advance angle/delay angle amounts θ) of the switching elements Q2 and Q5 by comparing the triangular waves B and B' which are generated based on the rectangular wave Ru that is in synchronization with the detected voltage of the U phase sub-coil Su, with the error amplifier output Vc. In addition, the control range of the advance angle is 0° to 120°, and the range of the delay angle is 0° to 60°.

In the same way, in the W phase it is possible to decide the ON/OFF timings (the advance angle/delay amounts θ) of the switching elements Q3 and Q6 by comparing the triangular waves C and C' which are generated based on the rectangular wave Rv that is in synchronization with the detected voltage of the V phase sub-coil Sv with the error amplifier output Vc. In addition, the control range of the advance angle is 0° to 120°, and the range of the delay angle is 0° to 60°.

FIG. 5A which shows delay angle control timings (0° to 120° (180° energization)) shows an operation in a delay angle control state (Vc>0) in place of the advance angle control state (Vc<0) shown in FIG. 4A.

In the same way as in FIG. 4A, the waveform (1) in FIG. 5A shows the rectangular wave Ru that is in synchronization with the detected voltage of the U phase sub-coil Su, the waveform (2) in FIG. 5A shows the triangular wave A that is generated from the W phase rectangular wave, and the waveform (3) in FIG. 5A shows the triangular wave A' that is obtained by phase shifting the triangular wave A by 180°.

The waveform (4) in FIG. 5A shows the rectangular wave Rv that is in synchronization with the detected voltage of the V phase sub-coil Su, the waveform (5) in FIG. 5A shows the triangular wave B that is generated from the U phase rectangular wave, and the waveform (6) in FIG. 5A shows the triangular wave B' that is obtained by phase shifting the triangular wave B by 180°.

Figure 5B:
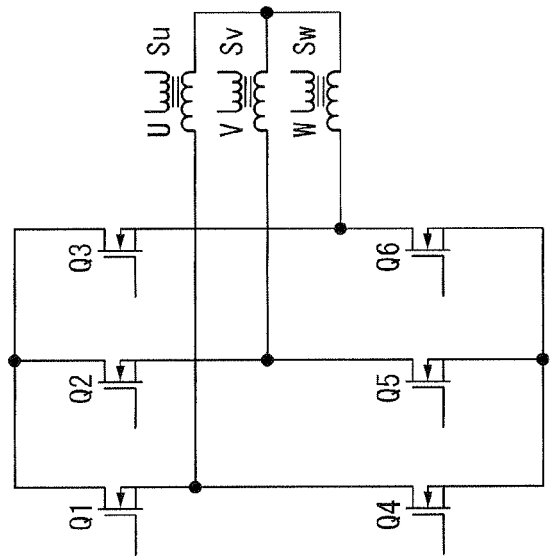
FIG. 5B is a circuit diagram showing the generator and the switching elements that are controlled at the delay angle control energization timing shown in FIG. 5A.

The waveform (7) in FIG. 5A shows the rectangular wave Rw that is in synchronization with the detected voltage of the W phase sub-coil Su shown in FIG. 5B, the waveform (8) in FIG. 5A shows the triangular wave C that is generated from the V phase rectangular wave, and the waveform (9) in FIG. 5A shows the triangular wave C' that is obtained by phase shifting the triangular wave C by 180°.

The above described rectangular waves Ru, Rv, and Rw are output from the U, V, W phase voltage detection circuit 11, while the triangular waves A, A', B, B', C, C' are output from the synchronous triangular wave generating circuit 12. The triangular waves A, A', B, B', C, C' are input into the comparator circuit 14, and are compared respectively with the error amplifier output Vc.

Note that the operation shown in FIG. 5A is the case where the advance angle control state shown in FIG. 4A (Vc<0) is simply changed to a delay angle control state (Vc>0), and thus, the basic operations are the same. Accordingly, a description of the basic operations is omitted here.

(Description of the Delay Angle Limit Setting Method of the Present Invention)

In FIG. 4A and FIG. 5A, a description is given of a method of deciding the energization timings (the advance angle/delay angle amounts θ) when performing advance angle/delay angle control. In the battery charging device of the present invention, when delay angle control is performed, the delay angle is controlled such that it does not increase to more than a delay angle amount that causes the maximum amount of power to be generated by the alternating current generator (to more than the delay angle limit value). This is because, if the delay angle exceeds the delay angle limit value, there is conversely a reduction in the amount of power generated by the alternating current generator, and, in the battery charging device of the present invention, a structure is employed in which the setting of this delay angle limit value can be performed automatically.

Figure 6:
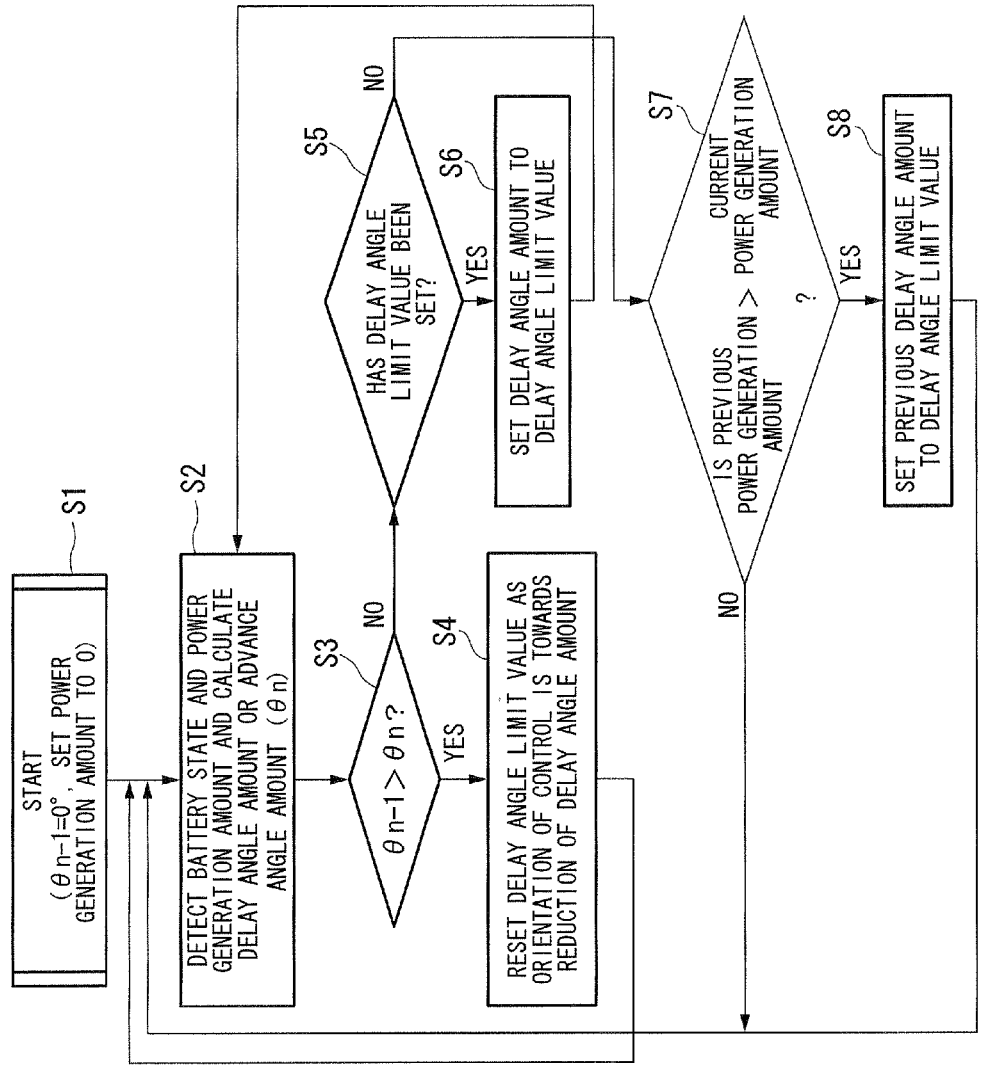
FIG. 6 is a flowchart showing a setting process to set a delay angle limit value in the embodiment of the present invention.

FIG. 6 is a flow chart showing a process to set a delay angle limit value. The process to set a delay angle limit value in the present invention is described below with reference to FIG. 6.

Firstly, the advance angle/delay angle amount θn−1 and the power generation amount which are variables are set to 0 (step S1). Next, the battery charging state and the power generation amount of the alternating current generator are detected, and, the current advance angle/delay angle amount θn is detected and these are all stored (step S2).

Next, the previous advance angle/delay angle amount θn−1 which has been stored as a variable is compared with the current advance angle/delay angle amount θn (step S3). When θn−1 is more than θn (θn−1>θn), because the orientation of the control is in the direction in which there is a reduction in the delay angle amount, when the delay angle limit value is set, this setting is cancelled (reset) (step S4), and the routine returns to step S2.

In step S3, when θn is more than θn−1 (θn>θn−1), the control is oriented in a direction in which there is an increase in the delay angle amount, and the routine moves to step S5 where a determination is made as to whether or not a delay angle limit value has already been set.

In step S5, if it is determined that a delay angle limit value has already been set, this delay angle amount is set to the delay angle limit value (step S6), and the routine returns to step S2. In the delay angle control, the delay angle amount is controlled such that it does not exceed this delay angle limit value. Note that this delay angle limit value is maintained until the control direction is oriented in a direction in which there is a decrease in the delay angle amount (for example, until the battery charging voltage rises).

In step S5, if it is determined that a delay angle limit value has not been set, the routine moves to step S7 and a determination is made as to whether or not the previous power generation amount is more than the current power generation amount (step S7).

Figure 7:
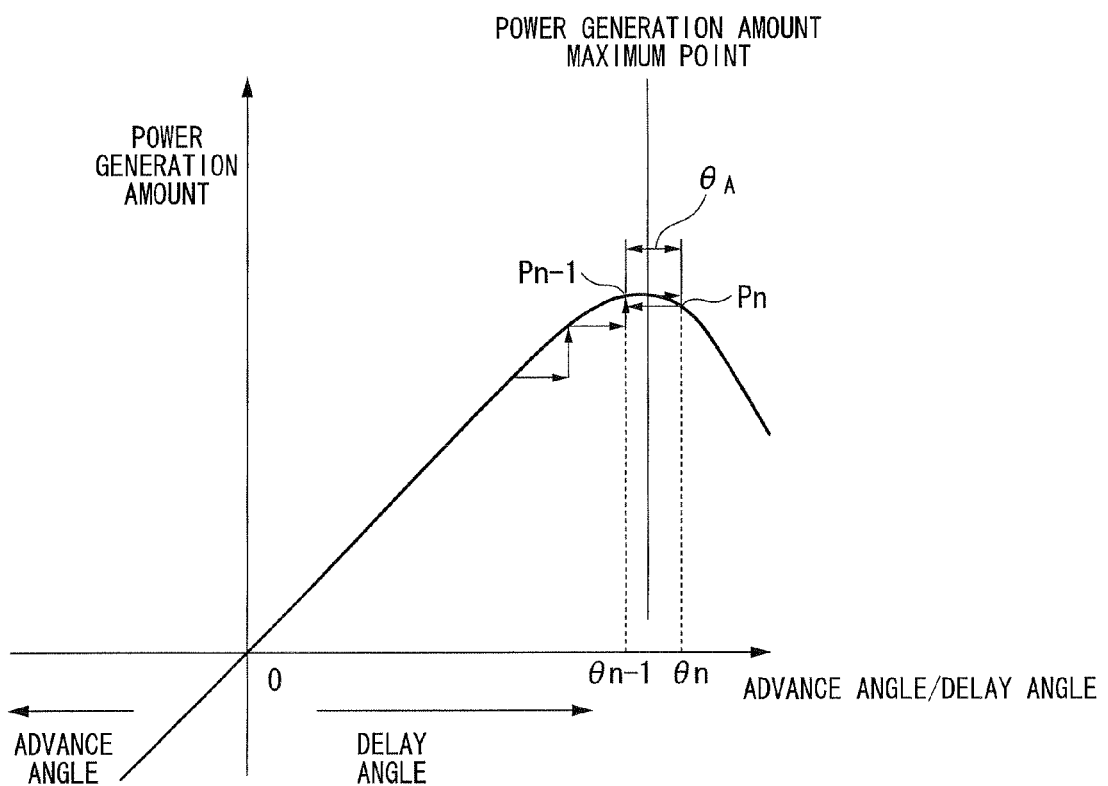
FIG. 7 shows a method of setting a delay angle limit value in the embodiment of the present invention.
Figure 8:
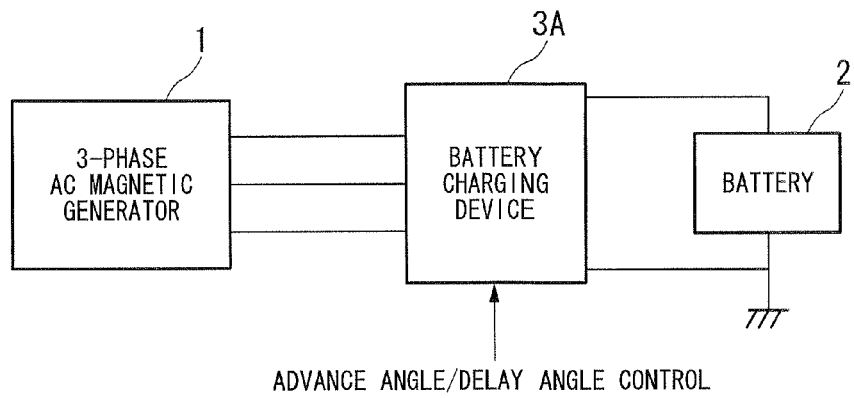
FIG. 8 is a block diagram illustrating a battery charging device.
Figure 9:
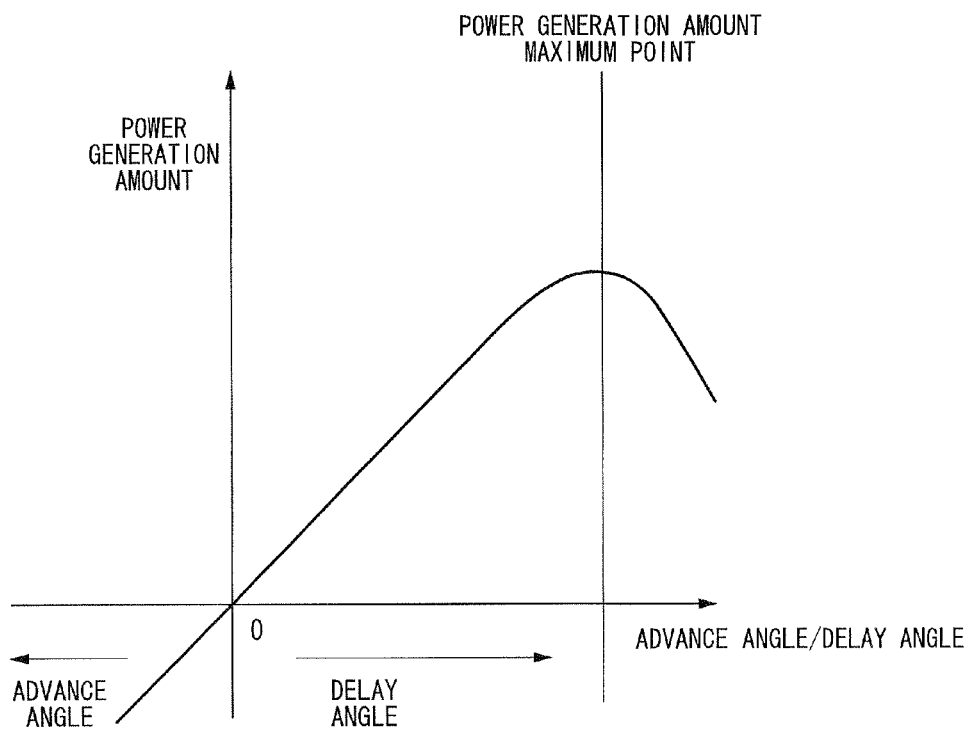
FIG. 9 is a graph illustrating advance angle/delay angle control.

If it is determined in step S7 that the previous power generation amount is more than the current power generation amount (previous power generation amount>current power generation amount), the delay angle amount for the previous power generation amount is set to the delay angle limit value (step S8). This is because, as shown in FIG. 7 which shows the method of setting a delay angle limit value, when the current power generation amount Pn is smaller than the previous power generation amount Pn−1 irrespective of the increase in the delay angle amount, because it is supposed that there is a point where the power generation amount is at maximum in a space $θ_A$ between Pn−1 and Pn, the delay angle amount θn−1 for the previous power generation amount Pn−1 is set to the delay angle limit value.

If it is determined in step S7 that the previous power generation amount is less than the current power generation amount (previous power generation amount<current power generation amount), the routine returns to step S2 without the delay angle limit value being set.

By performing the above described processing, it is possible to automatically set a delay angle limit value that provides the maximum power generation amount (more accurately, that provides substantially the maximum power generation amount), and it is possible to perform advance angle/delay angle control such that the delay angle amount does not exceed this delay angle limit value. Moreover, as is shown in FIG. 7, it is revealed that there is a point where the power generation amount is at maximum in the space $θ_A$, and when the delay angle amount is controlled to increase, it is possible for the delay angle to track the periphery of the point where the power generation amount is at maximum.

While embodiments of the invention have been described and illustrated above, it should be understood that the battery charging device of the present invention are not limited solely to these embodiments, and various modifications can be made without departing from the spirit or scope of the present invention.

INDUSTRIAL APPLICABILITY

In the present invention, because the effect is achieved that it is possible to automatically set an optimum delay angle limit value irrespective of alternating current generator, the type of battery, and the size of the displacement, the present invention is valuable for battery charging devices and for a delay angle control method used in these devices, and the like.

The invention claimed is:

1. A battery charging device that is connected between an alternating current generator and a battery, and converts alternating current power output from the alternating current generator into direct current power and supplies the direct current power to the battery, the device comprising:
   a rectifier circuit that has a bridge configuration formed by switching elements, and that performs advance angle/delay angle control by either advancing or delaying energization timing to the switching elements relative to a phase of an alternating current output voltage of the alternating current generator;
   a power generation amount calculation circuit that detects an output voltage and an output current of the alternating current generator, and calculates a power generation amount of the alternating current generator;
   an advance angle/delay angle calculation circuit that generates a differential voltage between a voltage of the battery and a predetermined target voltage, and determines an advance angle/delay angle amount of the energization timing to the switching elements based on the differential voltage;
   an advance angle/delay angle control circuit that performs advance angle/delay angle control of the switching elements using the advance angle/delay angle amount determined by the advance angle/delay angle calculation circuit, and that, when a delay angle amount exceeds a delay angle limit value in case where delay angle control is performed, performs delay angle control of the switching elements using the delay angle limit value; and
   a delay angle limit value setting circuit configured to dynamically store the delay angle amount and the power generation amount, and dynamically compare a previous delay angle amount and a previous power generation amount with a current delay angle amount and a current power generation amount, and when the current delay angle amount is larger than the previous delay angle amount and the previous power generation amount is larger than the current power generation amount, set the previous delay angle amount as the delay angle limit value.

2. The battery charging device according to claim 1, wherein:
the advance angle/delay angle control circuit performs delay angle control of the switching elements using the determined delay angle amount when the advance angle/delay angle amount determined by the advance angle/delay angle calculation circuit is a delay angle amount, and either the delay angle limit value is not set or the delay angle amount is less than the delay angle limit value; and
the delay angle limit value setting circuit stores the delay angle amount and the power generation amount, and compares the previous delay angle amount and the previous power generation amount with the current delay angle amount and the current power generation amount, so that
the delay angle limit value setting circuit sets the previous delay angle amount as the delay angle limit value when the current delay angle amount is larger than the previous delay angle amount and the previous power generation amount is larger than the current power generation amount, and
the delay angle limit value setting circuit cancels a setting of the delay angle limit value when the current delay angle amount is smaller than the previous delay angle amount.

3. The battery charging device according to claim 1, wherein:
the alternating current generator includes a sub-coil that detects the output voltage, and a current sensor that detects the output current;
the battery charging device further comprises a voltage detection circuit that generates a rectangular wave from a voltage waveform detected by the sub-coil of the alternating current generator that is in synchronization with the voltage waveform, a synchronous triangular wave generating circuit that generates a triangular wave that is in synchronization with a signal of the rectangular wave that is output from the voltage detection circuit, and an error amplifier that compares the voltage of the battery with the predetermined target voltage and outputs an error signal;
the power generation amount calculation circuit calculates the power generation amount of the alternating current generator based on the output voltage of the alternating current generator detected by the sub-coil, and on a value of the output current of the alternating current generator detected by the current sensor;
the advance angle/delay angle calculation circuit includes a comparator circuit that determines the advance angle/delay angle amount by comparing the triangular waves output from the synchronous triangular wave generating circuit with an output of the error amplifier;
the advance angle/delay angle control circuit receives the advance angle/delay angle amounts from the comparator circuit; and
the delay angle limit value setting circuit stores the delay angle amount determined by the comparator circuit, and the power generation amount determined by the power generation amount calculation circuit.

4. The battery charging device according to claim 3, wherein:
the rectangular wave in the voltage detection circuit and the triangular wave in the synchronous triangular wave generating circuit are generated for each of a U phase, a V phase, and a W phase; and
in the comparator circuit, when the advance angle/delay angle amount is determined by comparing the triangular wave output from the synchronous triangular wave generating circuit with the output of the error amplifier,
an advance angle/delay angle amount of the U phase is determined by comparing a triangular wave of the W phase output from the synchronous triangular wave generating circuit with the output of the error amplifier,
an advance angle/delay angle amount of the V phase is determined by comparing a triangular wave of the U phase output from the synchronous triangular wave generating circuit with the output of the error amplifier, and
an advance angle/delay angle amount of the W phase is determined by comparing a triangular wave of the V phase output from the synchronous triangular wave generating circuit with the output from the error amplifier.

5. The battery charging device according to claim 1, wherein the switching elements are N-channel MOSFET, and the battery charging device comprises a three-phase bridge rectifier circuit of the switching elements.

6. A delay angle control method for a battery charging device that is connected between an alternating current generator and a battery, and converts alternating current power output from the alternating current generator into direct current power and supplies the direct current power to the battery, the method comprising:
a rectifier step of using switching elements having a bridge configuration, and performing advance angle/delay angle control by either advancing or delaying energization timing to the switching elements relative to a phase of an alternating current output voltage of the alternating current generator;
a power generation amount calculation step of detecting an output voltage and an output current of the alternating current generator, and calculating a power generation amount of the alternating current generator;
an advance angle/delay angle calculation step of generating a differential voltage between a voltage of the battery and a predetermined target voltage, and determining an advance angle/delay angle amount of the energization timing to the switching elements based on the differential voltage;
an advance angle/delay angle control step of performing advance angle/delay angle control of the switching elements using the advance angle/delay angle amount determined in the advance angle/delay angle calculation step, and when a delay angle amount exceeds a delay angle limit value in case where delay angle control is performed, performing delay angle control of the switching elements using the delay angle limit value; and
a delay angle limit value setting step of dynamically storing the delay angle amount and the power generation amount, and dynamically comparing a previous delay angle amount and a previous power generation amount with a current delay angle amount and a current power generation amount, and when the current delay angle amount is larger than the previous delay angle amount and the previous power generation amount is larger than the current power generation amount, setting the previous delay angle amount as the delay angle limit value.

* * * * *